US006938329B2

(12) United States Patent
Turek et al.

(10) Patent No.: US 6,938,329 B2
(45) Date of Patent: Sep. 6, 2005

(54) ELECTRICAL CONNECTOR WIRE TRIM AND PRESS APPARATUS

(75) Inventors: James Turek, LaGrange, IL (US); Richard Sponder, New Lenox, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 623 days.

(21) Appl. No.: 10/024,845

(22) Filed: Dec. 18, 2001

(65) Prior Publication Data

US 2003/0110619 A1 Jun. 19, 2003

(51) Int. Cl.[7] ........................ B23P 19/00; H01R 43/042

(52) U.S. Cl. .......................... 29/753; 29/33 M; 29/751; 29/755; 29/861; 29/863; 72/446; 72/712

(58) Field of Search ................................ 29/33 M, 753, 29/861, 863, 751, 755; 72/446, 712, 184

(56) References Cited

U.S. PATENT DOCUMENTS

| | | | | |
|---|---|---|---|---|
| 5,704,110 A | * | 1/1998 | Erhard et al. | 29/566.3 |
| 5,706,570 A | * | 1/1998 | Inoue et al. | 29/566.2 |
| 5,799,391 A | * | 9/1998 | Tillotson | 29/753 |
| 6,530,257 B2 | * | 3/2003 | Ooji et al. | 72/420 |

FOREIGN PATENT DOCUMENTS

| | | | |
|---|---|---|---|
| JP | 2-44672 | * | 2/1990 |

* cited by examiner

*Primary Examiner*—Rick Chang
(74) *Attorney, Agent, or Firm*—Mark W. Croll, Esq.; Paul F. Donovan, Esq.; Welsh & Katz, Ltd.

(57) ABSTRACT

A press apparatus presses a wire into a wire connector that is carried on an elongated strip. The connector has an opening at a top thereof, is stored on the strip in a side-ways orientation and is fed into the press on the strip. The press includes a feed path having a reorienting section to reorient the connector to position the opening in an upward orientation. A guide portion defines a conveyance path and direction. The guide portion has opposing walls. A one-way feed assembly feeds the connector into the press and prevents reverse movement of the connector. The feed assembly includes a guide wall and a feed pawl disposed opposite the guide wall. A reciprocating press has a die operably connected thereto and reciprocates to move the die to press the wire into the connector when the wire is positioned above the connector opening. A linkage operably connects the feed pawl and the press such that movement of the reciprocating press advances the connector along the conveyance path to position the connector opening below the die for pressing a wire into the opening.

32 Claims, 6 Drawing Sheets

FIG. 3
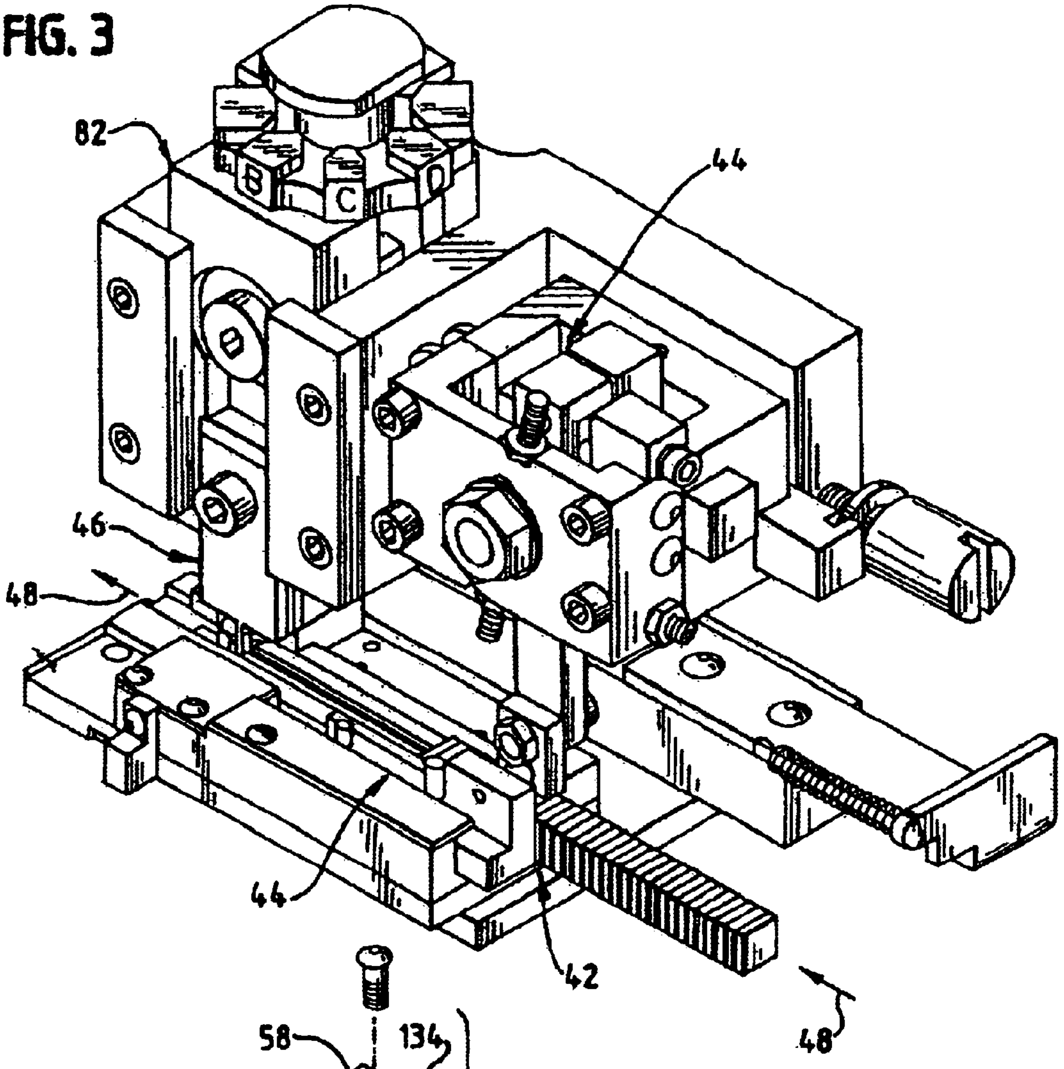
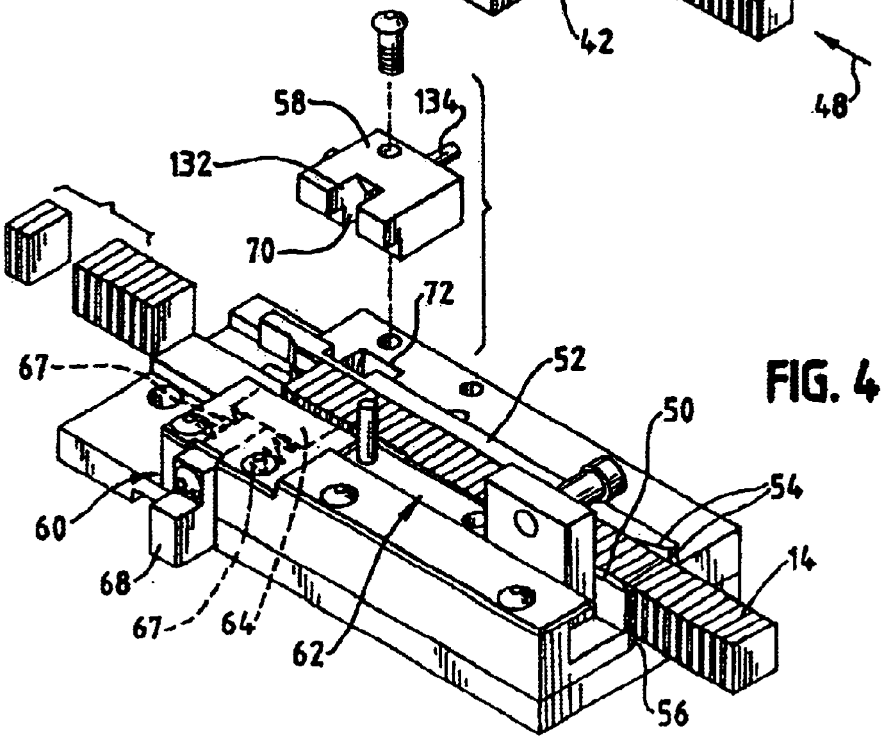
FIG. 4

FIG. 6
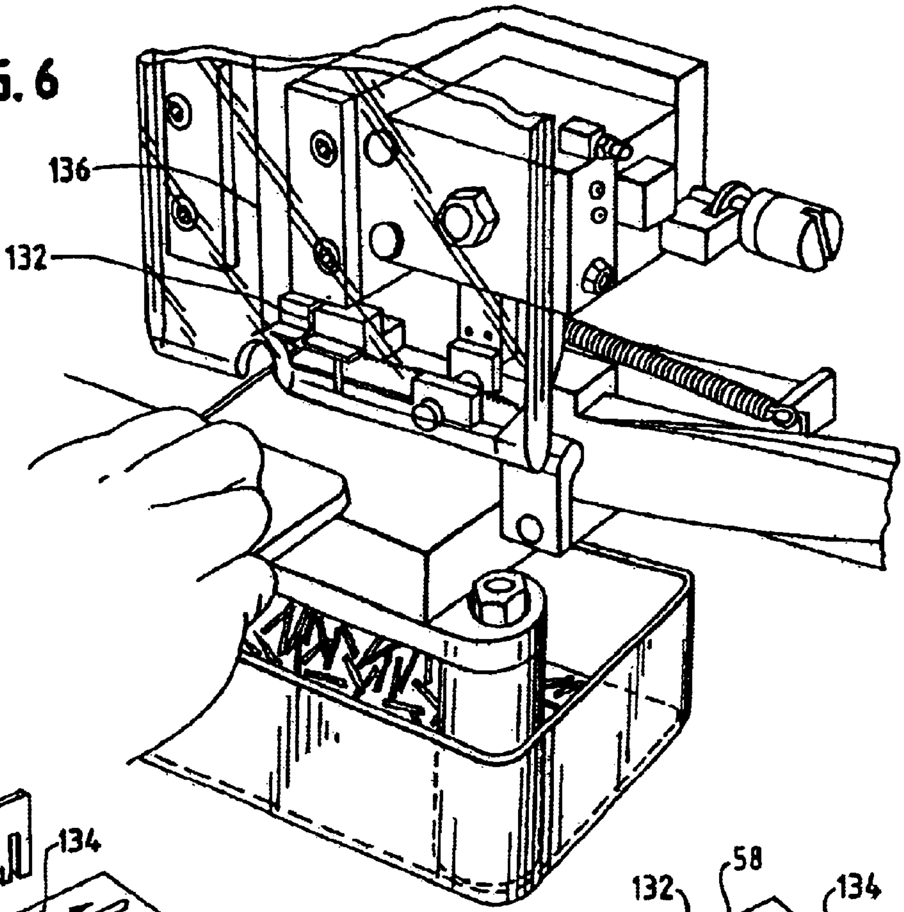
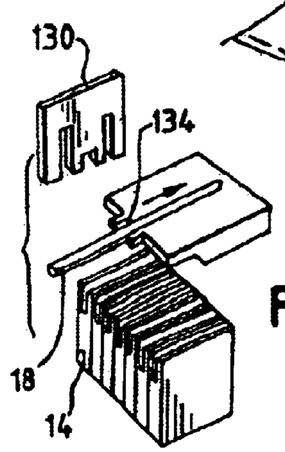
FIG. 7
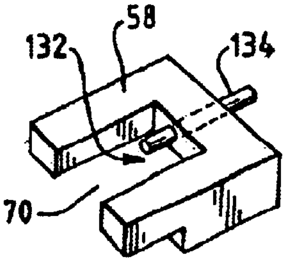
FIG. 7A
FIG. 8
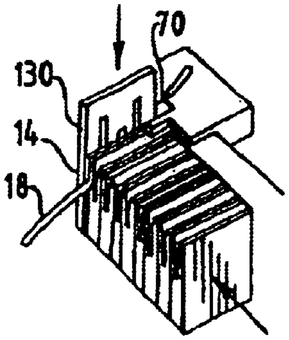
FIG. 9
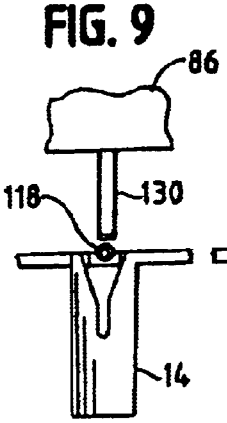
FIG. 10
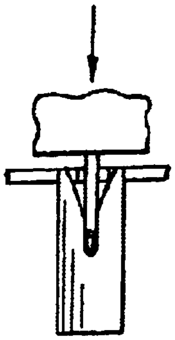
FIG. 11
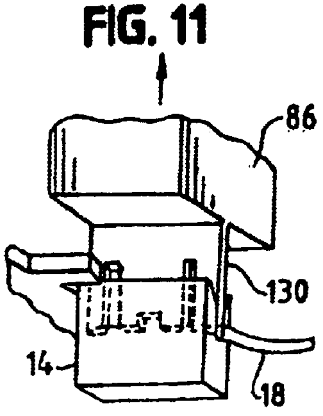

ELECTRICAL CONNECTOR WIRE TRIM AND PRESS APPARATUS

BACKGROUND OF INVENTION

Electrical connectors are in widespread use for connecting electrical wires to all types of components. Connectors provide for ready connection of a wire to the connector, and the connector to a component, thus providing electrical connection to the component. The connectors provide connection typically without stripping the cable or wire insulation, soldering the wire or the like.

These connectors include both insulation displacement type connectors in which insulation is cut or displaced from a wire as it is positioned in the connector, as well as standard connectors for use with bare conductors or wires. Although these connectors have come into widespread use, positioning the wires within the connector can still be in a time-consuming and laborious task. This is particularly so when wires must be trimmed from the end of the connector so as to prevent inadvertent shorting across the wires. Nevertheless, these connectors have provided and continue to provide tremendous benefits over previously used, shrink-tube and soldering methods.

A typical connector includes a housing, which can be formed from plastic and a metal contact, carried by the housing, to which the wire is connected. The wire is inserted or forced into the contacts to provide electrical connection. The plastic housing provides structural support for the contacts in that the contacts (and the connectors) are small component items as are the wires connected thereto. One known connector, available from ITW PANCON under the trade name MASCON is sized having wire spacings of 0.10 inches and 0.156 inches. As such, not only can the task of inserting the wires into the contacts within connectors be a labor intensive endeavor, but it is also one that requires delicate handling and precision operation.

Accordingly, there is need for a connector press apparatus that rapidly and accurately installs or presses wires into such connectors. Desirably, such a device selectively trims wire ends from the connectors. Most desirably, such a device is used with connectors that are provided on a spooled strip supporting material.

SUMMARY OF THE INVENTION

A press apparatus presses a wire (one wire at a time) into an associated connector. The connector is carried on an elongated strip and has an opening at its top. The connector is stored on the strip in a side-ways orientation and is fed into the press on the strip.

The press apparatus includes a feed path having a reorienting section adapted to receive the connector on the strip in the side-ways orientation and to reorient the connector to position the opening of the connector in an upward orientation. In a present embodiment, the feed path includes a chute defined by guide walls. the chute can include an entry section having a lower guide wall and an upper guide wall, with the lower guide wall extending rearwardly beyond the upper guide wall. The reorienting section can include a twist section, in which the upper and lower guide walls rotate (in a helical manner) to become side guide walls.

A guide portion is positioned downstream of the reorienting section and defines a conveyance path and a conveyance direction for the connector through the press apparatus. The guide portion is defined by opposing walls.

A one-way feed assembly feeds the connector in the conveyance direction and prevents reverse movement of the connector opposite the feed direction. The feed assembly includes a guide or retaining wall and a feed portion or pawl disposed opposite the retaining wall. In a present feed assembly, the feed pawl is configured to reciprocate and to move the connector into a position below the die. The feed pawl includes a plurality of asymmetrical teeth for engaging the connector.

In the present feed assembly, the guide wall is positioned opposite the feed pawl. A brake assembly is positioned adjacent (e.g., downstream of) the feed pawl and is biased toward the conveyance path. The brake assembly includes a plurality of teeth for engaging the connector to secure the connector in position below the die.

The apparatus further includes a reciprocating press having the die operably connected thereto. The reciprocating press is configured to reciprocate to move the die downwardly to press the wire into the connector when the wire is positioned above the connector opening.

A linkage operably connects the feed assembly and the press so that movement of the reciprocating press advances the connector along the conveyance path to position the connector opening below the die for pressing a wire into the opening. Preferably, the feed pawl is operably connected to the linkage for indexed movement of the connector. In this arrangement, the reciprocating press includes a cam for engaging the linkage. In a current embodiment, an upstroke of the reciprocating press advances the one-way feed assembly to index the connector to a position below the die.

The press apparatus can include a wire guide for positioning the wire above the connector opening. The wire guide can be adjustable to selectively trim the wire at a rear wall or surface of the connector.

The press apparatus can include a strip separator disposed downstream of the reciprocating press. The separator separates the connector from the strip. The strip can then be wound onto a spool away from the press work area.

Other features and advantages of the present invention will be apparent from the following detailed description, the accompanying drawings, and the appended claims.

BRIEF DESCRIPTION OF THE FIGURES

The benefits and advantages of the present invention will become more readily apparent to those of ordinary skill in the art after reviewing the following detailed description and accompanying drawings, wherein:

FIG. 3 is a perspective view of the press assembly illustrated with a strip of connectors at the press entry;

FIG. 4 is a partial exploded view of the guide assembly showing a top guide plate as illustrated with a strip of connectors in the conveyance path;

FIG. 6 is a schematic illustration showing an operator using the trimming press;

FIGS. 7 and 7A are partial views of a wire positioned above the connector opening and a die positioned above the wire (FIG. 7) and the top guide and wire guide illustrated without a wire for ease of illustration (FIG. 7A);

FIG. 8 is a perspective view similar to FIG. 7 with the die inserting or pressing the wire into the connector;

FIG. 9 is a front view illustrating the wire positioned above the connector and the die positioned above the wire;

FIG. 10 is a front view of the wire pressed into the connector;

FIG. 11 is a perspective view of the illustration of FIG. 10;

DETAILED DESCRIPTION OF THE INVENTION

Figure 1:
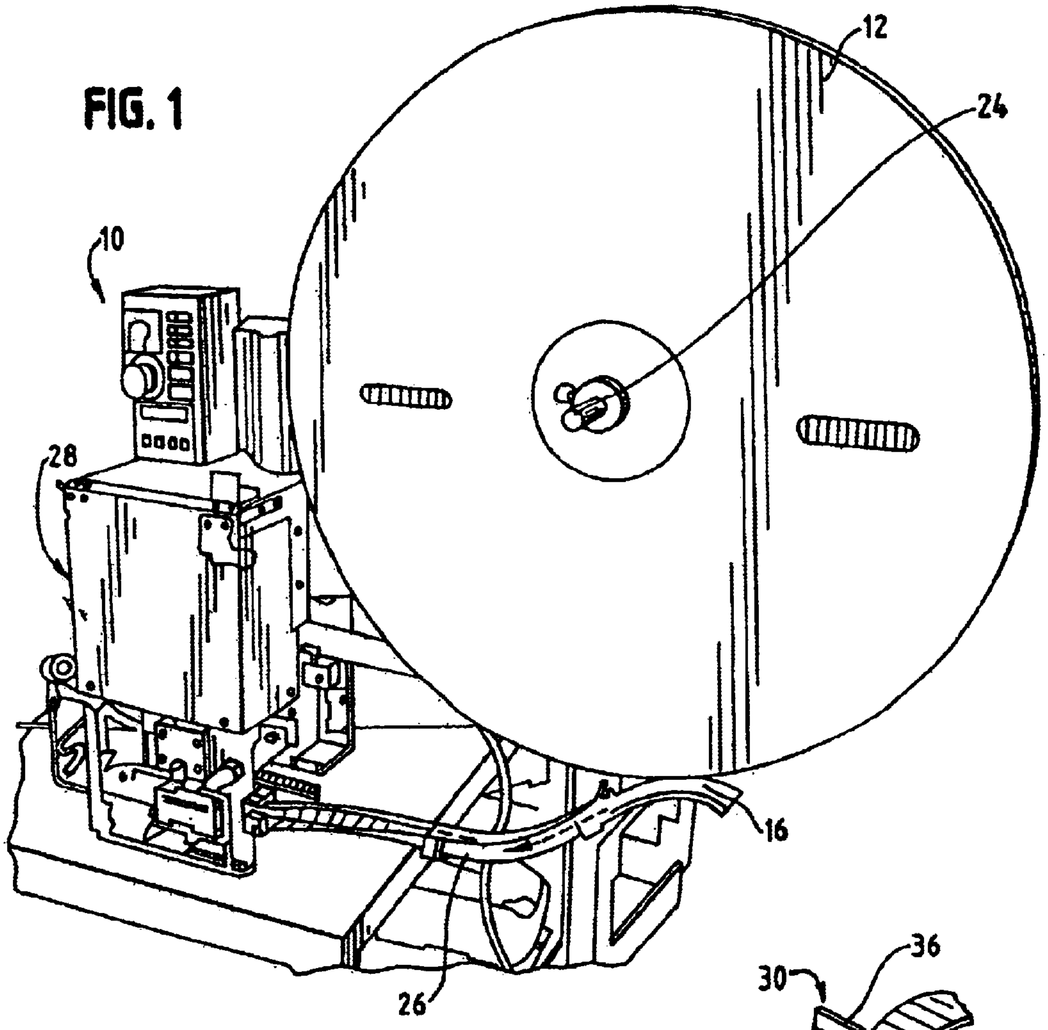
FIG. 1 is a perspective view of an exemplary wire connector press embodying the principles of the present invention, the press being illustrated with a spool of connectors mounted thereto.

While the invention is susceptible to various embodiments, there is shown in the drawings and will hereinafter be described specific embodiments with the understanding that the present disclosure is to be considered an exemplification of the invention and is not intended to limit the invention to the specific embodiments illustrated and described.

It is to be further understood that the title of this section of the specification, namely, "Detailed Description of the Invention," relates to a requirement of the United States Patent and Trademark Office, and does not imply, nor should be inferred to limit the subject matter disclosed herein and the scope of the present invention.

Referring now to the figures and in particular to FIG. 1. There is shown a connector wire trim and press apparatus 10 embodying the principles of the present invention. The apparatus 10 is shown with a roll or spool 12 of connectors 14 that are removably affixed to a tape or strip 16 carried around the spool 12. In such a manner, the connectors 14 can be fed from the spool 12 (which is essentially a storage arrangement) into the trim and press apparatus 10 for ready connection of wires 18 thereto.

Figure 15:
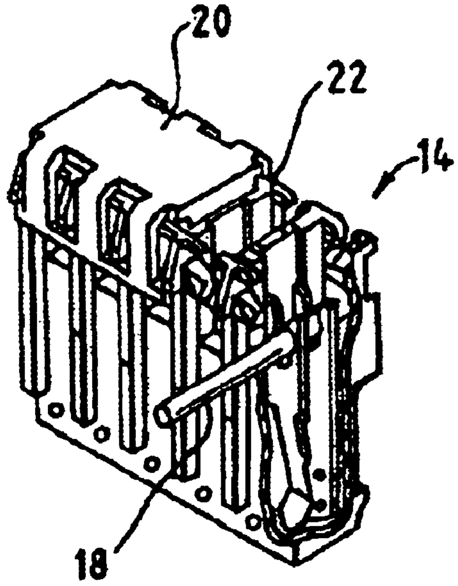
FIG. 15 is a perspective view of an exemplary connector illustrated with a wire terminated therein.

A typical connector 14 is illustrated in FIG. 15, which illustrates an optional snap-on cover 20, shown, in part, to illustrate one type of completed assembly. One wire 18 is shown connected to a first circuit position. Connectors 14 such as these are available from ITW PANCON under the trade name MASCON Connectors.

The connectors 14 are provided on the elongated strip or tape 16 which is wound about the spool 12. Those skilled in the art will recognize that these connectors 14 are used in a wide variety of different applications, and as such, may require differing numbers of circuits thereon. Known connectors 14 are available having anywhere from 2 up to about 36 circuit connections per connector 14. However, any number of circuit connections can be provided on connectors 14 for use with the present wire trim and press apparatus 10.

As wound onto the spool 12, the connectors 14 are oriented sideways to the length of the tape 16. In this orientation, the open side (indicated at 22) of each connector 14, which is that side on which the wire 18 is positioned prior to being pressed into the connector 14, is positioned on a side of the spool 12. In this orientation, the connector 14 is discharged from the spool 12 in a horizontal orientation (i.e., the open side 22 is horizontally oriented).

It has, however, been observed that installing the wire 18 and pressing the wire 18 into the connector 14 is more readily accomplished when the connectors 14 are reoriented, preferably 90°, so that the open side 22 of the connector 14 is oriented upwardly (i.e., on top). In this manner, an operator can position the wire 18 on the "top" or open portion 22 of the connector 14 and the wire 18 can be pressed downwardly while directly viewing the work area.

The apparatus 10 includes, generally, an axle or shaft 24 about which the spool 12 is mounted, a feed chute 26, and a trimming press 28. The spool 12 is mounted about the shaft 24, which is horizontally oriented, and discharges the connectors 14 on the elongated strip 16 into the chute 26.

Figure 2:
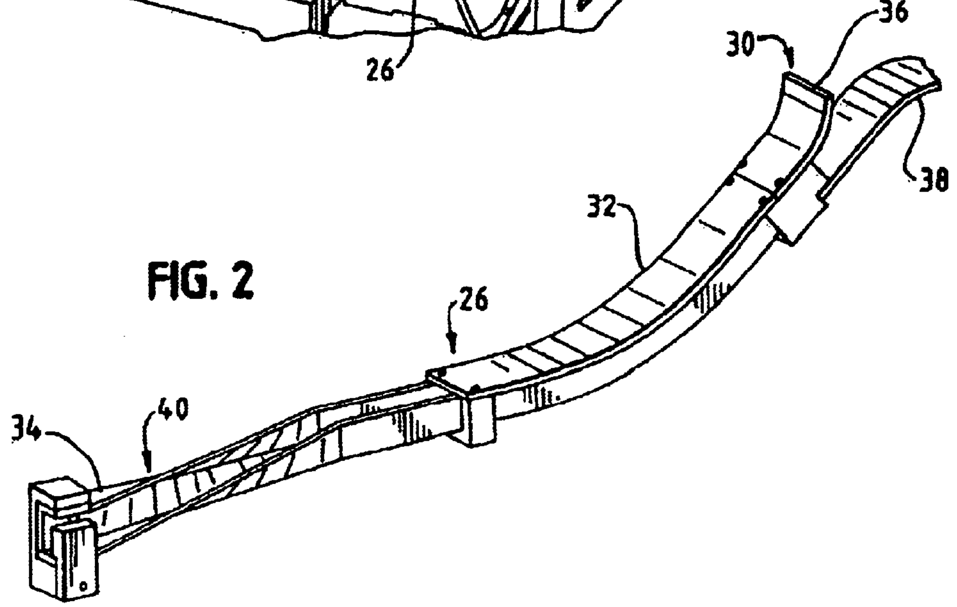
FIG. 2 is a perspective view of a transfer chute that extends between the spool and the reciprocating press.

Referring to FIG. 2, the chute 26 is configured to reorient the connectors 14 and includes an entrance portion 30, a downwardly inclined section 32 from the entrance portion 30 and an exit or discharge portion 34. The entrance 30 can include an enlarged entry defined by upper and lower guide walls 36, 38, respectively. The lower guide wall 36 extends rearwardly beyond the upper guide wall 38 and has an arcuate profile to provide a smooth transition for the strip supported connectors 14 discharged from the spool 12 and entering the chute 26. In this manner, if the connector strip 16 "sags" as it exits the spool 12, the lower guide 38 wall provides a smooth track for the strip 16 to move into the chute 26.

The downwardly inclined section 32 provides a path to convey the connectors 14 on the strip 16 from the spool 12 to a work surface. Essentially, the inclined section 32 provides a smooth transition from the spool 12 to the trimming press 28.

The chute 26 includes a twist portion indicated generally at 40, that is continuous with the downwardly inclined section 32. The twist portion 40 reorients the connectors 14 so that the open side 22 of the connector 14 is rotated from the horizontal to the vertical. This reorients the connectors 14 so that the connector open side 22 resides at a top of the connector 14 rather than at a side of the connector 14 (i.e., the connector open side 22 lies in a horizontal plane). As described below, in this manner, an operator merely needs to position the wire 18 at the top 22 of the connector 14 for subsequent pressing and, if desired trimming. It will be apparent from the drawings that this reorienting or twist section 40 (helically) rotates the upper and lower guide walls 36, 38 such that they become side guide walls.

Figure 5:
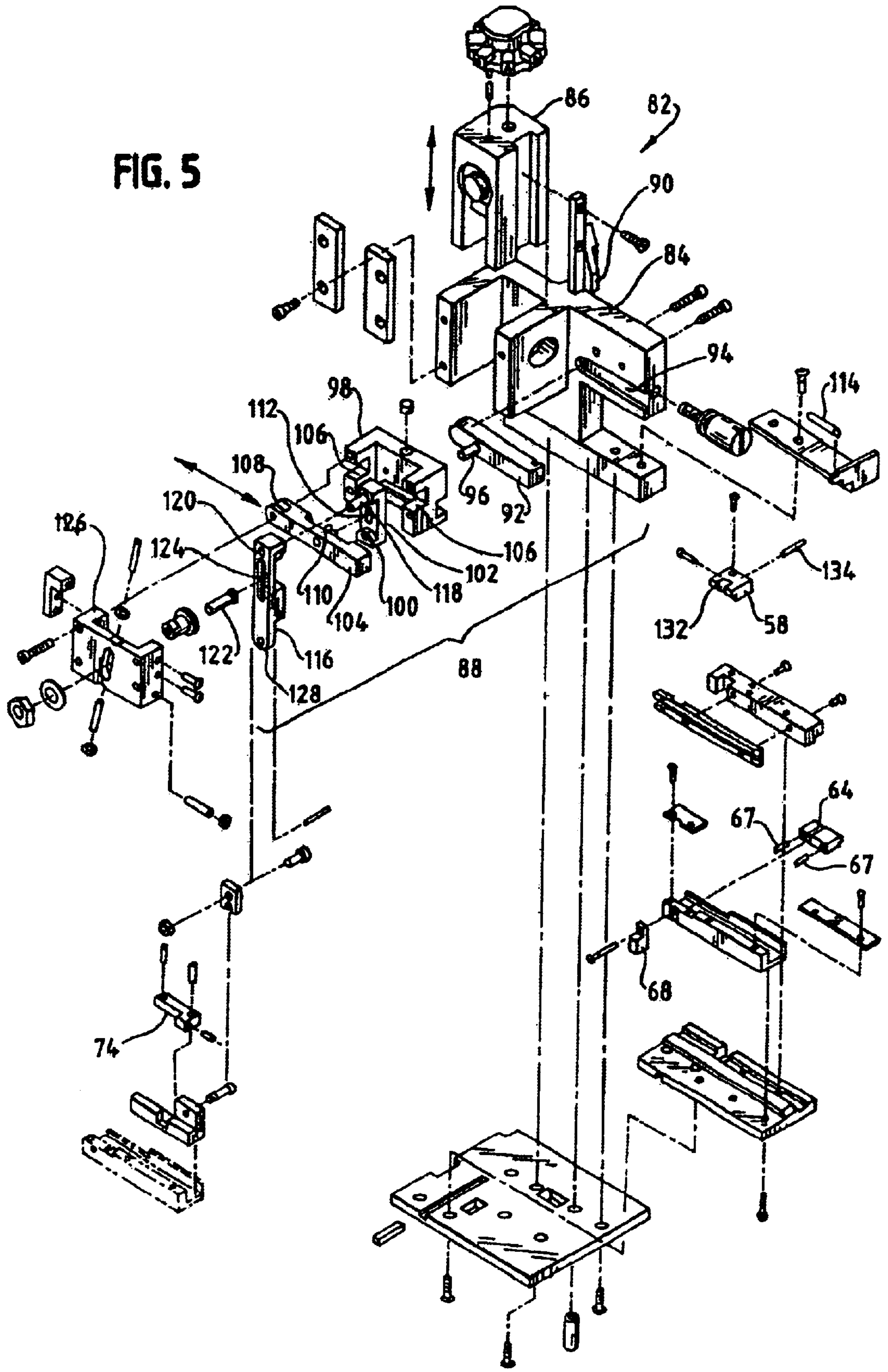
FIG. 5 is an exploded view of the trimming press, showing the press or slide portion and the connector feed assembly.

As the connectors 14 traverse through the chute 26, they are conveyed toward the press 28. As seen in FIGS. 3–5, the press 28 includes, generally, a guide portion 42, a feed assembly 44 and a reciprocating press portion 46. As will be discussed below, the press portion 46 includes the ability to trim the wire 18 end when the wire 18 is pressed into the connector 14.

The guide portion 42 defines a conveyance path, indicated at 48, through the press 28. An entrance is defined by forward and rear guide walls 50, 52, respectively, that center the entering connectors 14 and maintain the connectors 14 properly laterally aligned through the press 28. The guide walls 50, 52 at the entrance can include tapered surfaces, indicated at 54, providing an enlarged entrance, to urge the connectors 14 into proper lateral alignment in the event that the connectors 14 are slightly askew as they exit the chute 26. The guide portion 42 further includes a base surface 56 that provides a bottom or work surface along which the connectors 14 traverse through the press 28.

The guide portion 42 can include a top guide 58 that maintains the connectors 14 in contact with the base surface 56. The top guide 58 also prevents the connectors 14 from being "pulled" upward after the reciprocating press 46 presses the wire 18 into the connector 14 and subsequently withdraws from the connector 14.

The guide rear wall or retaining wall 52 provides a fixed or stationary surface along which the connectors 14 traverse. A feed portion 62 and the feed assembly 44 move the connectors 14 through the press 28 in an indexed, discretely positioned manner.

The feed portion 62 is configured as a hinged finger or feed pawl 74 having a pivoting, biased arrangement. The feed pawl 74 has a toothed or serrated (indicated at 76) head portion 78 providing ratcheted movement of the connectors 14. The feed pawl 74 is operably connected to the feed assembly 44 and reciprocates longitudinally along the conveyance path 48 to move the connectors 14 through the press 28 in an indexed manner. The feed pawl 74 serrations or teeth 76 are asymmetrically configured defining a contact surface 80 for engaging the connectors 14. The teeth 76 are formed at a sharp angle $\lambda$ relative to the contact surface 80 rising from the inlet direction and at a shallow or low angle $\delta$ rising from the discharge direction. In this manner, as the feed pawl 74 reciprocates, the teeth 76 engage the connector 14 and push the connector 14 through the press 28. When the feed pawl 74 reaches its full stroke, it reciprocates rearwardly, back to an initial position. The angle $\delta$ of the teeth 76 however are such that as the pawl 74 reciprocates rearwardly, the pawl 74 is urged against the bias and the teeth 76 slide along the connector 14. The feed pawl teeth 76 are configured (e.g., dimensioned) to cooperate with the connector 14 to index the connector 14 a predetermined distance toward the reciprocating press 46 with each stroke of the pawl 74.

A brake assembly 60 is configured to secure the connector 14 in place during the pressing operation. The brake assembly 60 is positioned downstream of the feed pawl 74. The assembly 60 includes a head portion or brake block 64 having teeth 66 that are configured to engage the connector 14. The block 64 is biased, as by springs 67 into the connector 14 engaging position, toward the conveyance path 48. A brake release 68 permits releasing the block 64 (i.e., moving the block away from the conveyance path 48) to permit indexing the connector 14.

The feed pawl 74 is driven by reciprocating movement of a slide assembly 82 that, as will be described below, is operably connected to the reciprocating press 46. The slide assembly 82, shown in exploded view in FIG. 5 for ease of illustration, includes a housing 84 and a slide 86 that reciprocates in an up-and-down motion within the housing 84, transverse to the indexed movement of the connectors 14. The slide 86 is operably connected to the feed pawl 74 by a cam and linkage arrangement indicated generally at 88. A cam 90 is formed on a side of the slide 86. The linkage assembly includes a first, fixed arm 92 that is positioned within a channel 94 formed in the housing 84.

A pivot pin 96 extends transversely from the fixed arm 92 through a support collar rear section 98 and into a lower opening 100 in a connecting link 102. The connecting link 102 is maintained in position by the rear collar section 98 and pivots about the pivot pin 96. A cam arm 104 is positioned in a pair of channels 106 in the collar rear portion 98 and includes a cam follower 108 formed on an end of the arm 104 that is contacted by the slide cam 90. A transfer pin 110 extends transversely from the cam arm 104 and is received in an intermediate opening 112 in the connecting link 102. The opening 112 is slotted or elongated. Thus, as the cam arm 104 reciprocates (by contact of the slide cam 90 with the cam arm follower 108), the transfer pin 110 transfers force and thus pivoting movement to the connecting link 102. In a present embodiment, the cam arm 104 is biased toward the slide 86 by a return spring 114.

A drive arm 116 is operably connected to the connecting link 102 by an upper drive pin 118 extending from the connecting link 102. The drive pin 118 is received in an opening 120 at an upper end of the drive arm 116. A pivot pin 122 is positioned through a central slotted opening 124 in the drive arm and is received in a forward collar section 126. In this manner, the collar sections 98, 126, which are secured to one another by fasteners, retain the linkage assembly 88 in an assembled manner. And, as will be appreciated from the figures, as the connecting link 102 pivots, that pivoting movement is transferred to the drive arm 116.

A lower end 128 of the drive arm 116 is operably connected to the feed pawl 74 to provide reciprocating movement to the pawl 74. Thus, as the slide 86 reciprocates in an up-and-down movement, that movement is translated into a side-to-side, reciprocating movement of the feed pawl 74 to move the connectors 14 through the press 28. The timing or indexing of the feed assembly 44 will be described below in conjunction with the pressing operation.

The slide 86 includes a pressing die 130 at a lower end thereof. The die 130 is configured to contact a wire 18 positioned at the top 22 of the connector 14 (at the opening) and press the wire 18 into place in the connector 14. Those skilled in the art will recognize that as the die 130 descends into the connector 14, the wire 18 is contacted and pressed into the connector 14. In a preferred embodiment, the reciprocating press 46 can be configured to sever the wire 18 at a desired location, e.g., at the end of the connector 14.

Following is a description of the operation of the slide 86 and feed assembly 44, with the side 86 initially in the lower or engaged position in which the die 130 has completed pressing the wire 18 into the connector 14. In the engaged position, the die 130 is fully engaged with the connector 14 (see FIGS. 10–11). In this position, the cam arm follower portion 108 is off of (e.g., disengaged from) the slide cam 90. As the slide 86 cycles (moves upwardly), the cam 90 moves into engagement with the follower 108, urging the follower 108 (and thus the cam arm 104) against the spring bias. As the die 130 pulls from the connector 14, the top guide 58 maintains the connector 14 in place on the work surface 56. The upward stroke of the slide 86 is translated into forward movement of the feed pawl 74 to move a new connector slot 14 into place in the feed position. At this time, the brake assembly 60 is released to permit the connector 14 to move.

The slide 86 continues upwardly to the top of stroke, in which position the new connector 14 slot is fully positioned below the die 130 for insertion of a wire 18. An operator then engages the brake 60 to secure the connector 14 in position. A wire 18 is positioned in a wire guide 132 to locate the wire 18 over the connector 14 slot. The operator than actuates the press, moving the slide 86 downwardly which moves the die 130 into contact with the wire 18, pressing the wire 18 into the connector 14. As the slide 86 moves downwardly, the feed pawl 74 retracts to engage the next desired indexed position of the connector 14.

As set forth above, the press apparatus 10 includes a wire guide 132 formed in the top guide 58 to properly position the wire 18 above the connector opening 22. A wire stop 134 is positioned at the rear of the wire guide 132. The wire stop 134 can be adjusted to provide a predetermined length of wire 18. To this end, the distance into which a wire 18 can be inserted into the guide 132 (until it contacts the stop 134) can be varied. Openings 70, 72, respectively are formed in the wire guide 132 and behind the rear guide wall 52, through which the trimmed wire portions can fall into, for example, a waste receptacle (not shown). This arrangement eliminates clutter and reduces the amount of wire trimmings from the work area.

The press 10 apparatus can include a guard 136, such as the transparent shield illustrated in FIG. 6. The guard 136 permits good visibility of the work area (e.g., the reciprocating press 46), while protecting the operator from the moving portions of the apparatus 10. The guard 136 can be movable (e.g., up and down) to move into and out of the work area. Additionally, the guard 136 can be interlocked so that the reciprocating press 46 can only be actuated when the guard 136 is in a proper position.

Figure 12:
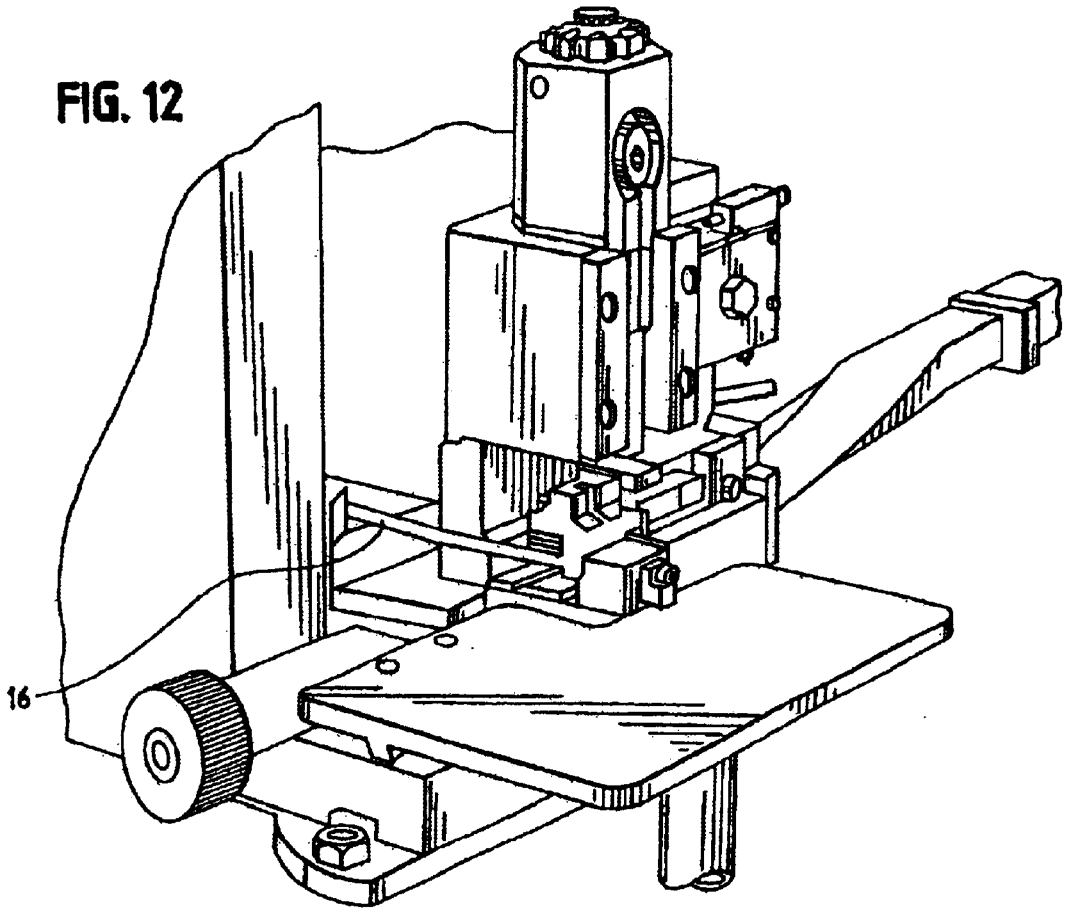
FIG. 12 is a perspective view of the feed and press portions of the apparatus.
Figure 13:
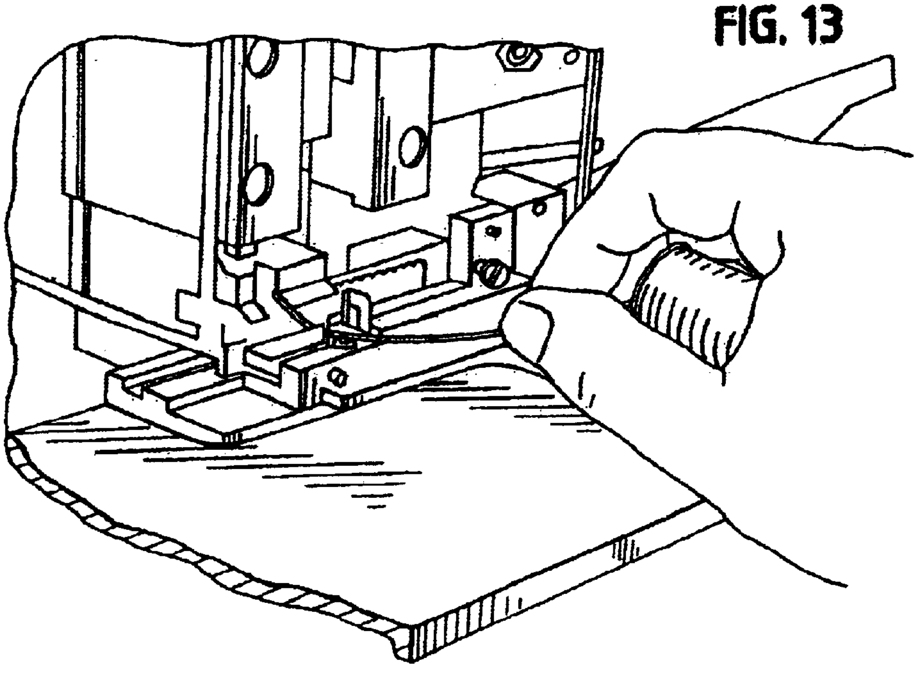
FIG. 13 is a perspective view showing an operator inserting the wire into the wire guide for subsequent pressing into the connector.
Figure 14:
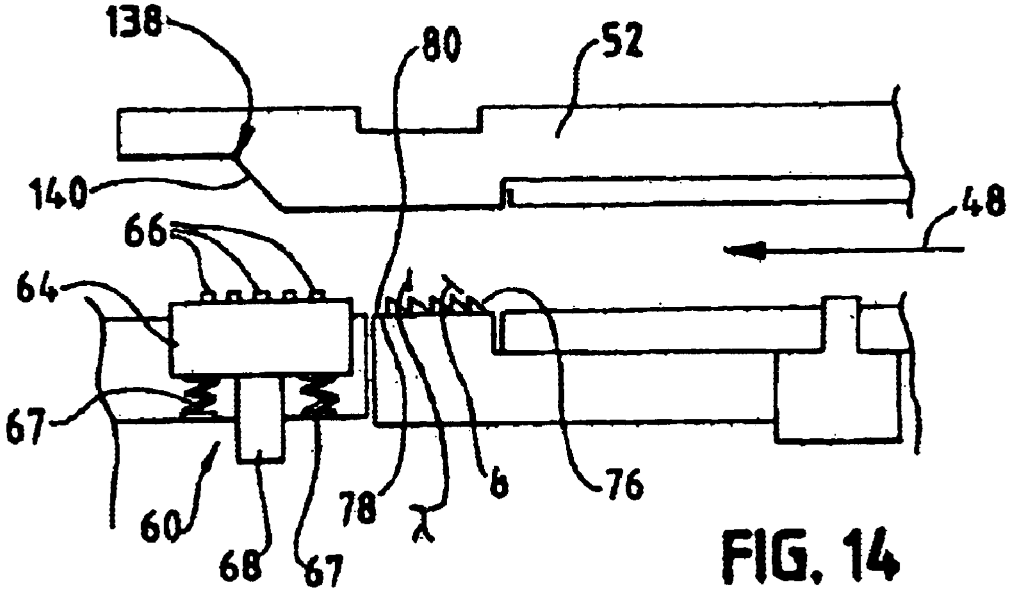
FIG. 14 is a top schematic illustration of the feed pawl and retaining wall positioned above along the conveyance path.

Referring now to FIGS. 4 and 14, the press apparatus 10 can also include a tape separator 138 at the rear of the press 10, downstream of the reciprocating press portion 46. The separator 138 includes a cut-out portion 140 in the rear wall 52 at about the end of the guide portion 42. The separator 138 separates the connectors 14 from the tape 16 on which they are carried, as the connectors 14 traverse through the press 28, by pulling the tape 16 rearwardly, as the connectors 14 are maintained in a straight-line manner along the conveyance path 48. As such, the tape 16 is pulled away from the connectors 14 as the tape 16 passes over the cut-out region 140 while the connectors 14 remain moving along the path 48. Separating the connectors 14 from the tape 16 prevents the connectors 14 from being carried by the tape 16 as the tape 16 passes from the press apparatus 10. The tape 16 is then wound onto a take-up spool (tape 16 shown exiting in FIG. 12) to maintain the tape strip 16 ordered. The separated connectors 14 are then discharged from the press apparatus 10.

Advantageously, the present wire press apparatus 10 provides positive operator control over the performance of a plurality of wire 18 connections that are made to a desired connector 14. It is anticipated that the press operation (e.g., actuation of the reciprocating press 46 and indexing of the connectors 14) will be accomplished by positive operator action, as by a foot pedal or the like. As set forth above, connectors 14 having essentially any practical number of circuits can have wires 18 terminated thereon using the present press 10. In addition, any special or desired requirements, vis-à-vis the wire 18 length beyond the connector 14 can be accommodated using the present press apparatus 10.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the invention. It is to be understood that no limitation with respect to the specific embodiment illustrated is intended or should be inferred. The disclosure is intended to cover by the appended claims all such modifications as fall within the scope of the claims.

What is claimed is:

1. A press apparatus for pressing a wire into an associated connector, the connector being carried on an elongated strip, the connector having an opening at a top thereof and being stored on the strip in a side-ways orientation, the connector being fed into the press on the strip, the press apparatus comprising:

a feed path, the feed path having a reorienting section adapted to receive the connector on the strip in the side-ways orientation and to reorient the connector to position the opening of the connector in an upward orientation;

a guide portion defining a conveyance path and a conveyance direction for the connector, the guide portion having opposing walls;

a one-way feed assembly to feed the connector in the conveyance direction and to prevent reverse movement of the connector opposite the feed direction, the feed assembly including a retaining portion and a feed portion disposed opposite the retaining portion;

a reciprocating press, the reciprocating press having a die operably connected thereto, the reciprocating press configured to reciprocate to move the die to press the wire into the connector when the wire is positioned above the connector opening;

a linkage operably connecting the feed assembly and the reciprocating press wherein movement of the reciprocating press advances the connector along the conveyance path to position the connector opening below the die for pressing a wire into the opening; and a brake assembly having a plurality of teeth for releasably securing the connector in place under the die.

2. The press apparatus in accordance with claim 1 including a wire guide for positioning the wire above the connector opening.

3. The press apparatus in accordance with claim 1 including a strip separator disposed downstream of the reciprocating press for separating the connector from the strip.

4. The press apparatus in accordance with claim 1 wherein the feed assembly includes a feed pawl configured to reciprocate and to move the connector into a position below the die.

5. The press apparatus in accordance with claim 4 wherein the feed pawl is operably connected to the linkage.

6. The press apparatus in aocordance with claim 4 wherein the feed pawl includes a plurality of teeth for engaging the connector.

7. The press apparatus in accordance with claim 6 wherein the teeth are asymmetrical.

8. The press apparatus in accordance with claim 1 wherein the brake assembly is biased toward the conveyance path.

9. The press apparatus in accordance with claim 1 wherein the reciprocating press includes a cam for engaging the linkage.

10. The press apparatus in accordance with claim 4 wherein the reciprocating press includes a cam for engaging the linkage, and wherein the linkage is operably connected to the feed pawl.

11. The press apparatus in accordance with claim 1 wherein an upstroke of the reciprocating press advances the one-way feed assembly to move the connector to a position below the die.

12. The press apparatus in accordance with claim 1 including a trimmer for trimming an end of the wire in conjunction with pressing the wire into the connector.

13. The press apparatus in accordance with claim 12 wherein the trimmer is adjustable.

14. The press in accordance with claim 1 wherein the feed path includes a chute defined by guide walls.

15. The press in accordance with claim 14 wherein the guide walls define an entry section.

16. The press in accordance with claim 15 wherein the entry section includes a lower guide wall extending rearwardly beyond an upper guide wall.

17. The press in accordance with claim 1 wherein the reorienting section is defined by a twist section.

18. A press apparatus for pressing a wire into an associated connector, the connector being carried on an elongated strip, the connector having an opening at a top thereof and being stored on the strip in a side-ways orientation, the connector being fed into the press on the strip, the press apparatus comprising:

a chute defining a feed path having a twisted section adapted to receive he connector on the strip in the side-ways orientation and to rotate the connector to position the opening of the connector in an upward orientation the chute having a twist section to reorient the connectors from an orientation in which the opening is horizontal to an orientation in which the opening is vertical;

a guide portion defining a conveyance path and a conveyance direction for the connector;

means for one-way feeding the connector in the conveyance direction;

means for preventing reverse movement of the connector in a direction opposite the conveyance direction;

means for laterally restraining movement of the connectors;

a reciprocating press, the reciprocating press having a die operably connected thereto, the reciprocating press configured to reciprocate to move the die to press the wire into the connector when the wire is positioned above the connector opening; and means operably connecting the one-way feed means and the reciprocating press.

19. The press apparatus in accordance with claim 18 including means for indexing movement of the connector through the press apparatus.

20. The press apparatus in accordance with claim 18 wherein the means operably connecting the one-way feeding includes linkage means.

21. The press in accordance with claim 18 wherein the feed path includes a chute defined by guide walls.

22. The press in accordance with claim 21 wherein the guide walls define an entry section.

23. The press in accordance with claim 22 wherein the entry section includes a lower guide wall extends rearwardly beyond an upper guide wall.

24. A press apparatus for pressing a wire into an associated connector, the connector being carried on an elongated strip, the connector having an opening at a top thereof and being stored on the strip in a side-ways orientation, the connector being fed into the press on the strip, the press apparatus comprising:

a chute defining a feed path, the feed adapted to receive the connector on the strip in the side-ways orientation and to reorient the connector to position the opening of the connector in an upward orientation, the chute having a twist section to reorient the connectors from an orientation in which the opening is horizontal to an orientation in which the opening is vertical;

a guide portion defining a conveyance path and a conveyance direction for the connector, the guide portion having opposing guide walls;

a one-way feed assembly to feed the connector in the conveyance direction and to prevent reverse movement of the connector opposite the feed direction, the feed assembly including a retaining portion and a feed portion disposed opposite the retaining portion;

a wire guide for positioning the wire above the connector opening;

a reciprocating press, the reciprocating press having a die operably connected thereto, the reciprocating press configured to reciprocate to move the die to press the wire into the connector when the wire is positioned above the connector opening;

a linkage operably connecting the feed assembly and the press wherein movement of the reciprocating press advances the connector along the conveyance path to position the connector opening below the die for pressing a wire into the opening; and a strip separator disposed downstream of the reciprocating press for separating the connector from the strip.

25. The press apparatus in accordance with claim 24 wherein the feed assembly includes a feed pawl configured to reciprocate and to move the connector into a position below the die and an opposing a guide wall, the apparatus including a brake assembly configured to restrain movement of the connector when it is in position below the die.

26. The press apparatus in accordance with claim 25 wherein the feed pawl includes an engaging surface for engaging the connector.

27. The press apparatus in accordance with claim 26 wherein the engaging surface includes a plurality of asymmetrical teeth.

28. The press apparatus in accordance with claim 25 wherein the feed pawl is operably connected to the linkage.

29. The press apparatus in accordance with claim 25 wherein the reciprocating press includes a cam for engaging the linkage, and wherein the linkage is operably connected to the feed pawl.

30. The press apparatus in accordance with claim 24 wherein an upstroke of the reciprocating press advances the one-way feed assembly to move the connector to a position below the die.

31. The press in accordance with claim 24 wherein the guide walls fine an entry section.

32. The press in accordance with claim 31 wherein the entry section includes a lower guide wall extending rearwardly beyond an upper guide wall.

* * * * *